(12) United States Patent
Huang et al.

(10) Patent No.: US 8,496,831 B2
(45) Date of Patent: Jul. 30, 2013

(54) DEHYDRATION PROCESSES USING MEMBRANES WITH HYDROPHOBIC COATING

(75) Inventors: Yu Huang, Palo Alto, CA (US);
Richard W. Baker, Palo Alto, CA (US);
Tiem Aldajani, San Jose, CA (US);
Jennifer Ly, San Jose, CA (US)

(73) Assignee: Membrane Technology and Research, Inc., Newark, CA (US)

( * ) Notice: Subject to any disclaimer, the term of this patent is extended or adjusted under 35 U.S.C. 154(b) by 596 days.

(21) Appl. No.: 11/897,675

(22) Filed: Aug. 30, 2007

(65) Prior Publication Data

US 2009/0057224 A1 Mar. 5, 2009

(51) Int. Cl.
*B01D 61/36* (2006.01)
*C02F 1/00* (2006.01)
*B01D 71/00* (2006.01)

(52) U.S. Cl.
USPC ........... 210/640; 210/634; 210/644; 210/651; 210/500.21

(58) Field of Classification Search
USPC .................. 210/321.6, 321.75, 500.1, 500.21
See application file for complete search history.

(56) References Cited

U.S. PATENT DOCUMENTS

| | | | |
|---|---|---|---|
| 4,755,299 A | | 7/1988 | Bruschke |
| 4,840,819 A | * | 6/1989 | Williams et al. ............... 427/245 |
| 5,049,167 A | * | 9/1991 | Castro et al. ...................... 95/55 |
| 5,051,114 A | * | 9/1991 | Nemser et al. ..................... 95/47 |
| 6,572,679 B2 | * | 6/2003 | Baker et al. ....................... 95/47 |
| 6,726,840 B1 | * | 4/2004 | Arcella et al. ............ 210/500.28 |
| 6,755,975 B2 | * | 6/2004 | Vane et al. ..................... 210/640 |
| 6,896,717 B2 | | 5/2005 | Pinnau et al. |
| 2004/0003714 A1 | * | 1/2004 | Bikson et al. ..................... 95/45 |
| 2005/0211624 A1 | * | 9/2005 | Vane et al. ............... 210/500.37 |
| 2007/0031954 A1 | | 2/2007 | Mairal et al. |

OTHER PUBLICATIONS

Gref et al. Transport properties of poly(vinyl alcohol) membranes of different degrees of crystallinity. I. Pervaporation results. J. Applied Polymer Sci. vol. 49 (1993), p. 209-218.*
Polyakov et al. Amorphous Teflons AF as organophilic pervaporation materials: Transport of individual components. J. Membrane Sci. vol. 216 (2003), p. 241-256.*
Ravindra et al. FTIR, diffusivity, selectivity, and aging studies of interactions of hydrazine, water, and hydrazine hydrate with the ethylcellulose membrane. Macromolecules. vol. 30 (1997), p. 3288-3292.*
Kim et al. Hydrophilic/hydrophobic IPN membranes for the pervaporation of ethanol-water mixture. Polymer Bulletin 20, 261-267 (1988).*
U.S. Appl. No. 11/715,245, filed Mar. 6, 2007, Huang et al.
U.S. Appl. No. 11/651,303, filed Jan. 9, 2007, Wynn et al.

* cited by examiner

*Primary Examiner* — Katherine Zalasky
(74) *Attorney, Agent, or Firm* — Janet Farrant; Kathi Bean

(57) ABSTRACT

Processes for removing water from organic compounds, especially polar compounds such as alcohols. The processes include a membrane-based dehydration step, using a membrane that has a dioxole-based polymer selective layer or the like and a hydrophilic selective layer, and can operate even when the stream to be treated has a high water content, such as 10 wt % or more. The processes are particularly useful for dehydrating ethanol.

32 Claims, 11 Drawing Sheets

DEHYDRATION PROCESSES USING MEMBRANES WITH HYDROPHOBIC COATING

This invention was made in part with Government support under award number NRCS-68-3A75-4-140, awarded by the United States Department of Agriculture, and award number DE-FG02-04ER84001 awarded by the United States Department of Energy. The Government has certain rights in this invention.

FIELD OF THE INVENTION

The invention relates to dehydration processes, particularly membrane-based dehydration processes.

BACKGROUND OF THE INVENTION

Membrane-based processes for removing water from water/organic compound mixtures are known. The processes may use membranes that are selective in favor of water over organics, or selective for organics over water. Most processes use water-selective membranes. Such membranes typically have a dense, hydrophilic water-selective layer on a porous support, and are very effective at treating solutions or mixtures in which water is present in relatively small amounts.

Representative membranes of this type are described in U.S. Pat. No. 4,755,299, for example. Typical materials from which the selective layer of the membrane are made include polyvinyl alcohol (PVA), cellulose triacetate and other cellulose derivatives. If large amounts of water are present, this selective layer tends to swell, reducing the separation capability of the membrane. Under prolonged exposure to high water concentrations, the membrane may start to dissolve or disintegrate completely. The problem is exacerbated if the feed solution is hot. Such membranes cannot be used to treat fluids that have high water concentrations.

In a variety of industrial applications, most notably manufacture of alcohols from biomass, the solutions to be treated are hot and can contain 20, 30, 40, 50 wt % or more of water. To treat these and other similar solutions or vapor mixtures, there remains a need for membranes that are able to withstand such conditions.

U.S. Published Patent Application 2007/0031954, co-owned with the present application, describes an ethanol recovery process using both ethanol-selective and water-selective membranes.

Currently pending U.S. patent application Ser. No. 11/715, 245, filed Mar. 6, 2007, entitled Liquid-Phase and Vapor-Phase Dehydration of Organic/Water Solutions, and co-owned with the present application, describes the use of fluorinated dioxole membranes to dehydrate alcohols and other organic compounds. This patent application is incorporated herein by reference in its entirety.

U.S. Pat. No. 6,896,717 describes gas separation membranes having hydrocarbon-resistant coatings, include those made from perfluorinated polymers of various types, to protect them from attack by $C_{3+}$ hydrocarbons in the feed stream.

SUMMARY OF THE INVENTION

The invention is a process for removing water from mixtures of water with organic compounds. The mixture may be a solution or a vapor-phase mixture. If the mixture is a solution, a basic embodiment of the processes includes the following steps:

(a) providing a composite membrane having a feed side and a permeate side, the composite membrane comprising:
 (i) a microporous support layer;
 (ii) a first dense selective layer of a hydrophilic polymer; and
 (iii) a second dense selective layer of a dioxole-based polymer having the structure

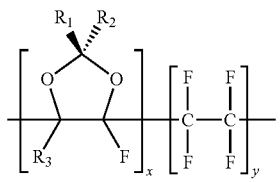

wherein $R_1$ and $R_2$ are fluorine or $CF_3$, $R_3$ is fluorine or $-O-CF_3$, and x and y represent the relative proportions of the dioxole and the tetrafluoroethylene blocks, such that $x+y=1$; the first dense selective layer being positioned between the microporous support layer and the second dense selective layer;
(b) passing a feed solution comprising water and an organic compound across the feed side;
(c) withdrawing from the feed side a dehydrated solution having a lower water content than that of the feed solution;
(d) withdrawing from the permeate side a permeate vapor having a higher water content than that of the feed solution.

If the mixture is in the vapor phase, a basic embodiment of the process includes the following steps:
(a) providing a composite membrane having a feed side and a permeate side, the membrane comprising:
 (i) a microporous support layer;
 (ii) a first dense selective layer of a hydrophilic polymer; and
 (iii) a second dense selective layer of a dioxole-based polymer having the structure

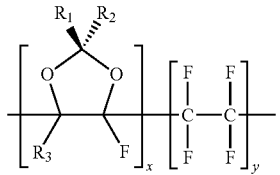

wherein $R_1$ and $R_2$ are fluorine or $CF_3$, $R_3$ is fluorine or $-O-CF_3$, and x and y represent the relative proportions of the dioxole and the tetrafluoroethylene blocks, such that $x+y=1$; the first dense selective layer being positioned between the microporous support layer and the second dense selective layer;
(b) passing a feed vapor comprising water and an organic compound across the feed side;
(c) withdrawing from the feed side a dehydrated vapor having a water content lower than that of the feed solution;
(d) withdrawing from the permeate side a permeate vapor having a higher water content than the feed solution.

In both basic embodiments, the driving force for trans-membrane permeation of water is the difference between the vapor pressure of water on the feed and permeate sides of the membrane. This pressure difference can be generated in a variety of ways, for example, by heating the feed liquid, compressing the feed vapor and/or maintaining lower pressure or a partial vacuum on the permeate side.

In the first embodiment, the process is carried out under pervaporation conditions. By pervaporation conditions, we mean that the feed is in the liquid phase, and the pressure on the permeate side is such that the permeating water is in the gas phase as it emerges from the membrane. The process results, therefore, in a permeate vapor stream enriched in water, and a liquid residue stream depleted in water.

In the second embodiment, both the feed and permeate streams are in the vapor phase. The process results in a permeate vapor stream enriched in water, and a vapor residue stream depleted in water.

In both cases, the composite membrane has at least three layers: a microporous support layer, a thin, dense hydrophilic layer on the microporous support, and a thin, dense dioxole-based layer on the hydrophilic layer. Representative polymers that can be used for the hydrophilic layer include polyvinyl alcohol (PVA); cellulose acetate, and other cellulose derivatives; polyvinyl pyrrolidone (PVP); ion-exchange polymers, such as Nafion® and other sulfonated materials; and chitosan.

The dioxole-based layer is made from specific dioxole-based polymers, preferably either having the structure:

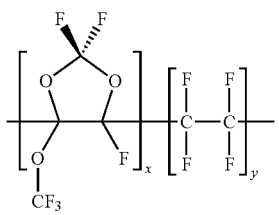

where x and y represent the relative proportions of the dioxole and the tetrafluoroethylene blocks, such that x+y=1, or the structure

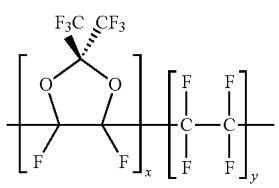

where x and y represent the relative proportions of the dioxole and the tetrafluoroethylene blocks, such that x+y=1.

Unexpectedly, we found in earlier work that these and other hydrophobic, dioxole-based polymers can be used effectively as selective layers of composite membranes to separate water from organic compounds, even polar organic compounds. The use of these and other similar polymers as selective layers for dehydration membranes and processes is disclosed in currently pending U.S. patent application Ser. No. 11/715,245, filed Mar. 6, 2007.

In the present invention, both the hydrophilic layer and the dioxole-based layer have selectivity for water over the organic compounds from which the water is to be removed. The intrinsic selectivity of the hydrophilic polymer is normally higher than that of the dioxole-based polymer.

Very surprisingly, we have found that, when membranes having the above structures are used, the processes of the invention can manifest higher selectivity for water over the organic compound than can be achieved under the same process conditions by either the hydrophilic polymer or the top layer polymer used alone as the selective layer of the membrane.

The feed fluid to be treated by the process of the invention contains at least water and an organic compound. The water may be a minor component or the major component of the fluid, and can be present in any concentration. The fluid may be a solution or a vapor-phase mixture.

The organic compound may be any compound or compounds able to form solutions or vapor mixtures with water. Our processes are particularly useful for removing water from polar organic compounds, such as ethanol and other alcohols, and other organic compounds in which water is readily soluble or miscible with water, such as esters or organic acids. Such separations are important in the manufacture of bioethanol and other biofuels.

In either embodiment, the process may be configured in various ways, and may include a single membrane unit or an array of two or more units in series or cascade arrangements, as is familiar to those of skill in the art.

In another aspect, the invention is a composite membrane comprising:
(i) a microporous support layer;
(ii) a first dense selective layer of a hydrophilic polymer; and
(iii) a second dense selective layer of a dioxole-based polymer having the structure

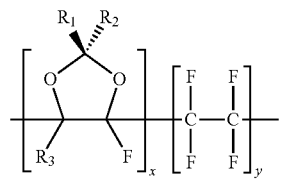

wherein $R_1$ and $R_2$ are fluorine or $CF_3$, $R_3$ is fluorine or $-O-CF_3$, and x and y represent the relative proportions of the dioxole and the tetrafluoroethylene blocks, such that x+y=1; the first dense selective layer being positioned between the microporous support layer and the second dense selective layer.

The membrane is preferentially characterized in that, when challenged with a feed solution containing 20 wt % water at a set of operating conditions that include a temperature of 75° C., the composite membrane has a higher water/organic compound selectivity than that of either (a) a first membrane having only a hydrophilic polymer selective layer of the same hydrophilic polymer as the first dense selective layer, or (b) a second membrane having only a dioxole-based polymer selective layer of the same dioxole-based polymer as the second dense selective layer, all as measured at the set of operating conditions.

The processes of the invention may include additional separation steps, carried out, for example, by adsorption, absorption, distillation, condensation or other types of membrane separation. One preferred embodiment of the invention of this type comprises a stripping or distillation step followed by a membrane separation step carried out using multilayer composite membranes as described above.

In another aspect, the invention is a process for making ethanol by combining a fermentation step, with multiple water/ethanol separation steps in series, one of the separation steps being a membrane dehydration step carried out using multilayer composite membranes as described above.

In all aspects of the invention, another, but less preferred alternative is to use another type of perfluorinated, high permeability material for the second selective layer.

It is to be understood that the above summary and the following detailed description are intended to explain and illustrate the invention without restricting its scope.

DETAILED DESCRIPTION OF THE INVENTION

Figure 1:
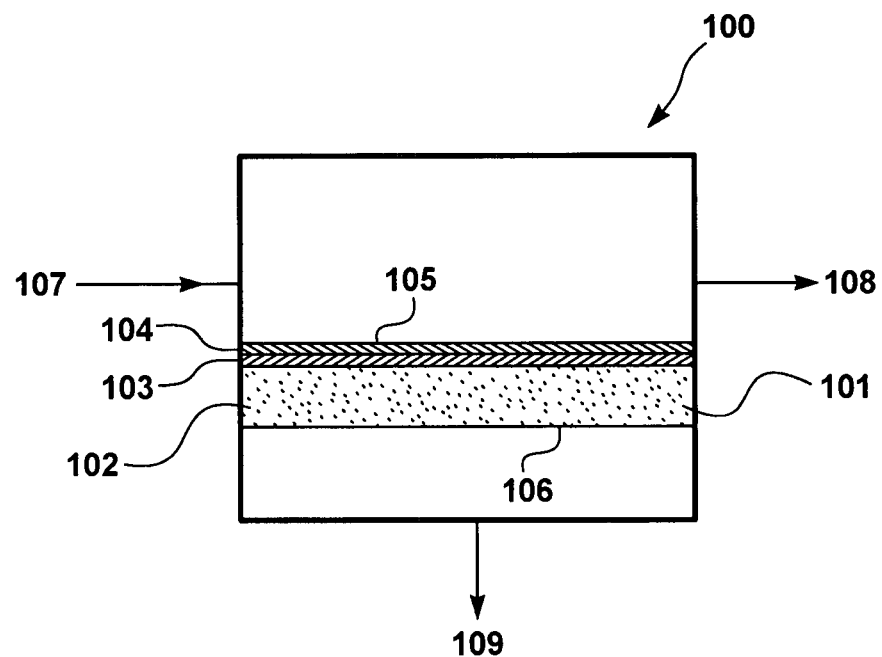
FIG. 1 is a schematic drawing of a basic embodiment of the invention.

The term mixture as used herein means any combination of an organic compound and water, including solutions and vapor-phase mixtures. The term also refers to a solution, plus undissolved organics or water present as a separate phase. As used herein, the term mixture typically refers to mixtures of an organic compound and water that are liquid at room temperature and pressure.

The term separation factor refers to the overall separation factor achieved by the process. The separation factor is equal to the product of the separation achieved by evaporation of the liquid and the selectively achieved by selective permeation through the membrane.

All liquid mixture percentages herein are by weight unless otherwise stated.

Gas or vapor mixture percentages are by volume unless otherwise stated.

The invention is a process for removing water from fluid mixtures containing water and organic compounds. The fluid may be in the gas or the liquid phase.

The separation is carried out by running a liquid or vapor stream of the fluid mixture across a membrane that is selective for water over the organic compound. The process results in a permeate stream enriched in water and a residue stream depleted of water, that is, dehydrated.

In one embodiment, the process is performed under pervaporation conditions, as explained in more detail below, so that the feed is in the liquid phase and the permeate stream is in the gas or vapor phase.

In another embodiment, the process is performed in the gas or vapor phase so that the feed and permeate streams are both in the gas or vapor phase.

The process of the invention can be used to dehydrate many water/organic mixtures. We believe the process of the invention is of particular value in dehydrating solutions or vapor mixtures containing an organic compound that has good mutual miscibility or solubility with water, especially those containing an organic compound in which water has a solubility of at least about 5 wt % or 10 wt %. By way of example, the process of the invention is particularly useful for separating water from alcohols, ketones, aldehydes, organic acids and esters, including methanol, ethanol, isopropanol, butanol, acetone, acetic acid and formaldehyde.

One or multiple organic compounds may be present in the solution to be dehydrated. A common example of a multi-organic mixture to be treated is ABE, an acetone-butanol-ethanol mixture typically produced by fermentation and used as a source of butanol and other valuable chemicals.

The processes of the invention are characterized in terms of the materials used for the selective layers of the membrane, or by the process operating conditions in terms of water concentration in the feed mixture.

The streams to which the present invention applies are predominantly composed of organic components and water; however inorganic components, including salts or dissolved gases, may be present in minor amounts.

Water may be a major or minor component of the mixture, and the water concentration may range from ppm levels to 80 wt % or more, for example. Unlike most prior art membrane dehydration processes, the process is suitable for streams containing large amounts of water, by which we mean stream containing more than about 10 wt % water, and in particular streams containing more than about 15 wt %, 20 wt %, 30 wt % water, or even streams in which water is the major component.

The scope of the invention is not limited to any particular type of stream. The feed streams may arise from diverse sources that include, but are not limited to, fermentation processes, chemical manufacturing, pharmaceutical manufacturing, electronic components manufacture, parts cleaning, processing of foodstuffs and the like. As a particular example, the invention is useful for separating ethanol and water from a fermentation broth arising from bioethanol production.

The process of the invention in various embodiments is shown in FIGS. 1-5. It will be appreciated by those of skill in the art that these are very simple schematic diagrams, intended to make clear the key aspects of the invention, and that an actual process train will usually include many additional components of a standard type, such as heaters, chillers, condensers, pumps, blowers, other types of separation and/or fractionation equipment, valves, switches, controllers, pressure-, temperature-, level- and flow-measuring devices and the like.

A simple flow diagram of a basic embodiment of the invention is shown in FIG. 1. Referring to this figure, feed stream, 107, enters membrane unit, 100, and flows across the feed side, 105, of composite membrane, 101. The membrane has three layers: a microporous support membrane, 102, a hydrophilic layer, 103, and a dioxole-based layer, 104. The hydrophilic layer is positioned between the support layer and the dioxole-based layer. These three layers are now discussed individually.

So long as it offers essentially no resistance to permeation compared with the selective layers, the nature of the support membrane is not critical to the invention, and the membrane may be made from such typical known materials as polysulfone, polyetherimide (PEI), polyacrylonitrile, and polyvinylidene fluoride (PVDF), for example. The most preferred support layers are those with an asymmetric structure, having a smooth, comparatively dense surface on which to coat the selective layer. Optionally and preferably, the support membrane includes a porous backing web, not shown, onto which the support membrane has been solution-cast.

The hydrophilic polymer layer is adjacent to the support membrane, and the dioxole-based polymer layer is the top selective layer. The layers operate together to provide properties that could not be provided by either layer alone. Both layers are made from polymers that have high water/organic compound selectivity, at least when tested with solutions that contain no more than about 10 wt % water. The hydrophilic polymer has higher intrinsic selectivity than the dioxole-based polymer, and preferably should have a selectivity of at least about 200 under low water concentration test conditions (less than 10 wt % water). Suitable hydrophilic polymers include, but are not limited to, polyvinyl alcohol (PVA); cellulose acetate and all other cellulose derivatives, polyvinyl pyrrolidone (PVP); ion-exchange polymers, such as Nafion® and other sulfonated materials; and chitosan.

The top selective layer polymer is a dioxole-based polymer. These polymers are hydrophobic, and generally exhibit much lower water permeability and water/organic compound selectivity than hydrophilic polymers membranes under low water concentration test conditions (less than 10 wt % water). Despite their hydrophobic nature, however, we previously discovered that membranes formed from these polymers can operate well to dehydrate organic/water solutions. Unlike their hydrophilic counterparts, they can maintain a relatively stable performance when exposed to fluid mixtures with high water concentrations, such as more than 20 wt % water, even when the mixture is hot.

A measure of the chemical stability and hydrophobic nature of the polymer is its resistance to swelling when exposed to water. This may be measured in a very simple manner by weighing a film of the pure polymer, then immersing the film in boiling water for a period. When the film is removed from the water, it is weighed immediately, and again after the film has been allowed to dry out and reach a stable weight.

The dioxole-based polymer that forms the top selective layer of our membrane is sufficiently stable in the presence of water that a film of the polymer immersed in water at 100° C. for 24 hours at atmospheric pressure will experience a weight change of no more than about 10 wt %, and more preferably no more than about 5 wt %. If the film is removed from the boiling water and weighed immediately, its weight will have increased compared with the original weight because of the presence of sorbed water. This weight increase should be no more than 10 wt % and preferably no more than 5 wt %. After the film is dried out and the weight has stabilized, it is weighed again. If the film has suffered degradation as a result of the water exposure test, the weight may have decreased. The weight loss compared with the original weight should be no more than 10 wt % and preferably no more than 5 wt %.

In contrast, the polymer used for the hydrophilic layer almost always fails this test.

The preferred dioxole-based polymers for use in the present invention are copolymers having the structure

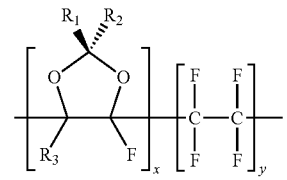

wherein $R_1$ and $R_2$ are fluorine or $CF_3$, $R_3$ is fluorine or $-O-CF_3$, and x and y represent the relative proportions of the dioxole and the tetrafluoroethylene blocks, such that $x+y=1$.

Specific highly preferred materials include copolymers of tetrafluoroethylene with 2,2,4-trifluoro-5-trifluoromethoxy-1,3-dioxole having the structure:

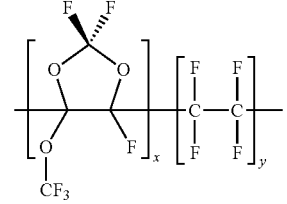

where x and y represent the relative proportions of the dioxole and the tetrafluoroethylene blocks, such that $x+y=1$.

Such materials are available commercially from Solvay Solexis, of Thorofare, N.J., under the trade name Hyflon®AD. Different grades are available varying in proportions of the dioxole and tetrafluoroethylene units, with fluorine:carbon ratios of between 1.5 and 2, depending on the mix of repeat units. For example, Hyflon®AD60 contains a 60:40 ratio of dioxole to tetrafluoroethylene units; Hyflon®AD80 contains an 80:20 ratio of dioxole to tetrafluoroethylene units.

Yet other preferred materials have the structure

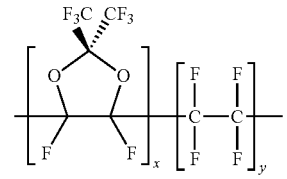

where x and y represent the relative proportions of the dioxole and the tetrafluoroethylene blocks, such that $x+y=1$. Such materials are available commercially from DuPont Fluoroproducts of Wilmington, Del. under the trade name Teflon®AF. These materials are also available in different grades of different glass transition temperature. Teflon®AF1600 is our most preferred grade.

The preparation of composite membranes for gas and liquid separations is well known in the art, and the membrane may be made by any convenient technique. Typically, the microporous support membrane is cast from solution onto a removable or non-removable backing, and the selective layers are solution coated onto the support. As mentioned above, it is preferred that the support membrane have an asymmetric structure, with much finer, smaller pores in the skin layer to facilitate coating. Such membranes may be made by the Loeb-Sourirajan process.

The hydrophilic selective layer is positioned between the support membrane and the top selective layer. The hydrophilic layer may be contiguous with the support membrane. In this case, the hydrophilic layer is usually deposited directly on the support surface by solution coating, followed by curing, cross-linking or any other post-deposition treatment that may be needed. Such steps are familiar to those of skill in the art.

As a less preferred alternative, the support membrane may be cast as an integral asymmetric membrane from a suitable hydrophilic polymer, the casting recipe and technique being such that the skin layer of the asymmetric membrane is sufficiently dense, and hence selective, to serve as the hydrophilic layer. Membranes having a cellulose triacetate hydrophilic selective layer can be made in this way, for example.

Instead of the support and hydrophilic layers being contiguous, a gutter layer may optionally be used between the support membrane and the hydrophilic selective layer, for example to smooth the support surface and channel fluid to the support membrane pores. In this case, the support membrane is first coated with the gutter layer, then with the hydrophilic layer.

The dioxole-based selective layer is applied as the top selective layer, usually directly onto the hydrophilic layer by solution coating. Optionally a sealing layer may be applied on top of the dioxole-based layer to protect the membrane. The use of highly permeable polymers as sealing or gutter layers is known in the art.

The membranes may be made in the form of flat sheets or hollow fibers, for example, and formed into membrane modules of any convenient type. We prefer to use flat sheet membranes assembled into spiral-wound modules.

The hydrophilic layer is shielded from direct contact with the feed fluid by the dioxole-based top selective layer. We have discovered that this prevents the hydrophilic layer from excessive swelling and degradation in the presence of liquids or vapors of high water concentration. As a result the processes of the invention provide higher selectivity under certain operating conditions than prior art processes using membranes with only a hydrophilic selective layer.

As a guideline, the membranes should preferably provide a selectivity of at least about 50 and more preferably at least about 100, when tested with a 50/50 ethanol/water mixture at 75° C.

We have found, very surprisingly, that the membranes of the invention offer higher selectivity, under conditions where they are exposed to a high water concentration in the feed, than can be achieved either by a membrane having only a hydrophilic selective layer or a membrane having only a dioxole-based selective layer under the same set of operating conditions. Comparative test results demonstrating this unexpected phenomenon with feed solutions containing 20 wt % water or more, and carried out at the high temperature of 75° C. are given in Example 7 below.

The thickness of each of the selective layers independently should generally be no thicker than 10 µm, and preferably no thicker than 5 µm. In particular, it is preferred that the dioxole-based layer be very thin, such as less than 2 µm, as the dioxole is the less permeable polymer, and an overly thick layer will reduce the permeance of the membrane to an undesirably low level. Most preferably, the dioxole-based selective layer thickness should be in the range 0.1-1 µm.

Preferably, the finished membrane provides a water permeance of at least about 500 gpu, and most preferably at least about 1,000 gpu, coupled with a water/organic compound selectivity of at least about 100, when in operation in the processes of the invention.

The separation factor provided by the process may be higher or lower than the membrane selectivity, depending on the relative volatilities of the organic component and water.

Returning to FIG. 1, feed stream 107 is passed across feed side 105 of water-selective membrane 101. The feed stream is separated into residue stream, 108, which is withdrawn from the feed side as a water-depleted residue, and permeate stream, 109, which is withdrawn from the permeate side, 106, as a water-enriched permeate, 109.

The driving force for transmembrane permeation of water is the difference between the water vapor pressure on the feed and permeate sides. In other words, the vapor pressure of water on the feed side is higher than the vapor pressure on the permeate side. This pressure difference can be generated in any convenient manner, such as by heating or compressing the feed stream, by maintaining the permeate side under vacuum, or by a combination of these methods.

The preferred method of generating driving force depends to some extent on whether the process is to be performed in pervaporation or vapor separation mode. In pervaporation mode, the feed is in the liquid phase, and the pressure on the permeate side is such that the permeating water is in the gas phase as it emerges from the membrane. In vapor permeation mode, the feed, residue and permeate streams are all vapors as they enter and leave the membrane unit.

Figure 2:
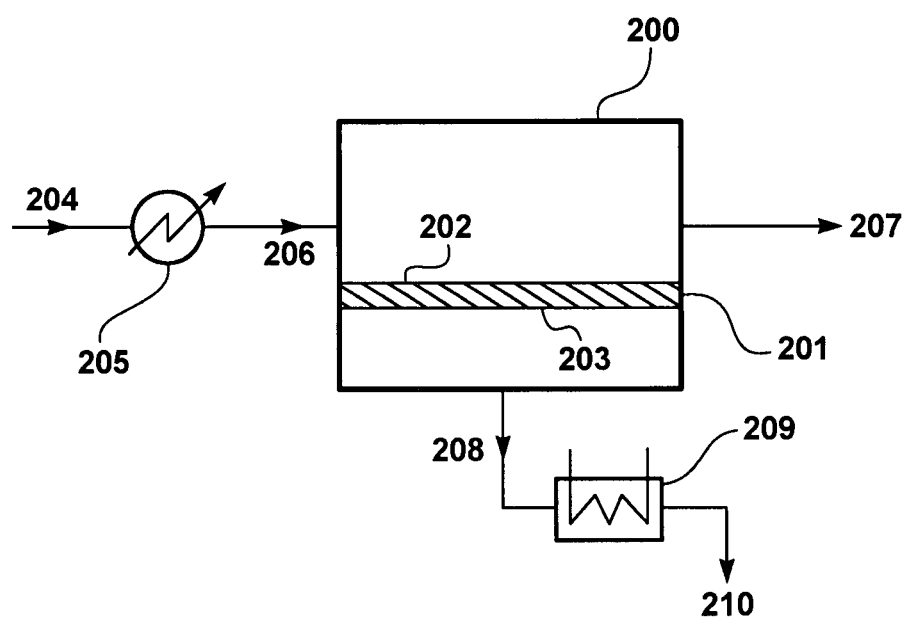
FIG. 2 is a schematic drawing of a basic pervaporation embodiment of the invention.

A basic representative embodiment of the invention in pervaporation mode is shown in FIG. 2. In this embodiment, it is assumed that the transmembrane driving force is created by heating the feed solution and by condensing the permeate vapor. Other methods of providing the driving force, such as by using a vacuum pump on the permeate side, could optionally be used.

Referring to this figure, liquid feed solution, 204, is heated in step, 205, and enters membrane unit or step, 200, as heated feed solution, 206. The membrane unit contains water-selective composite membrane, 201, of the composite type described above, having feed side, 202, and permeate side, 203. Water preferentially permeates the membrane and emerges from the permeate side as permeate vapor stream, 208. This stream is passed into condenser or condensation step, 209, and is withdrawn as water-rich condensate stream, 210. Condensation of the permeate reduces the vapor pressure in the permeate lines, thereby exposing the permeate side of the membrane to a partial vacuum and increasing the transmembrane driving force. The dehydrated residue solution is withdrawn as stream 207 from the feed side.

Figure 3:
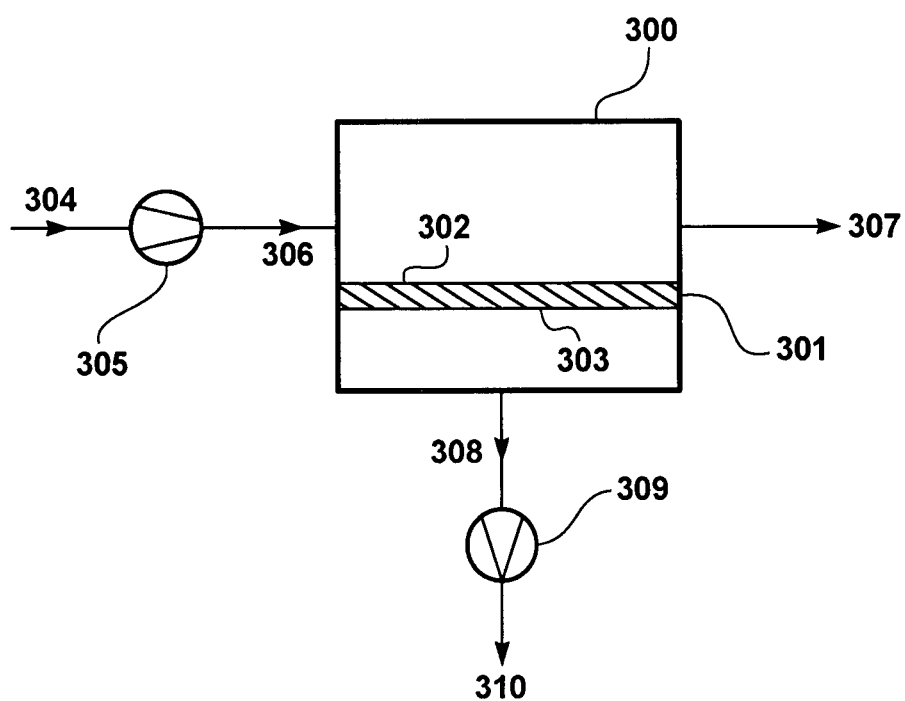
FIG. 3 is a schematic drawing of a basic vapor phase embodiment of the invention, including compression of the feed vapor.

A basic representative embodiment of the invention in vapor separation mode is shown in FIG. 3. In this embodiment, it is assumed that the transmembrane driving force is created by compressing the feed vapor and using a vacuum pump to create a partial vacuum on the permeate side. Other methods of providing the driving force, such as condensing the permeate vapor, could optionally be used.

Referring to this figure, feed vapor, 304, is compressed in compressor or compression step, 305, and enters membrane unit or step, 300, as compressed feed vapor, 306. The membrane unit contains water-selective composite membrane, 301, of the composite type described above, having feed side, 302, and permeate side, 303. Water vapor preferentially permeates the membrane and emerges from the permeate side as permeate vapor stream, 308. This vapor is drawn through vacuum pump, 309, and exhausted as water-rich vapor stream, 310. The dehydrated residue vapor is withdrawn as residue stream, 307, from the feed side.

In both the pervaporation and vapor separation modes of operation, supplying the feed stream to the membrane at elevated temperature increases the transmembrane driving force and is preferred. Most preferably, the feed stream temperature should be in the range 30-120° C., such as 40° C., 60° C., 75° C. or 100C, depending on the specific separation to be performed and other operating parameters. For example, for ethanol/water separations, a typical feed stream temperature might be 75° C., 90° C. or 110° C. Temperatures much above 130° C., are not preferred, and temperatures above about 140° C. should be avoided, because of potential damage to the polymeric membranes or other modules components, such as glues and spacers.

In the simple schematic diagrams of FIGS. 1, 2 and 3, the membrane separation step is indicated as single box 100, 200 or 300. In each case, this step is carried out in a membrane separation unit that contains one or more membrane modules. The number of membrane modules required will vary according to the volume flow of the stream to be treated, the composition of the stream, the desired compositions of the permeate and residue streams, the operating temperature and pressure of the system, and the available membrane area per module.

Systems may contain as few as one membrane module or as many as several hundred or more. The modules may be housed individually in pressure vessels or multiple elements may be mounted together in a sealed housing of appropriate diameter and length. Most preferably, the membrane modules, also known as membrane elements, are housed in a vessel that provides heating or reheating within the vessel, as disclosed in currently pending U.S. patent application Ser. No. 11/651,303 filed Jan. 9, 2007.

Depending on the performance characteristics of the membrane, and the operating parameters of the system, the process can be designed for varying levels of separation. A single-stage process in a typical example of a feed containing 20 wt % water might remove about 90% of water from the feed stream, to yield a residue stream containing 2 wt % water and a permeate stream containing 70 or 80 wt % water. This degree of separation is adequate for many applications.

If the residue stream requires further purification, it may be passed to a second bank of modules, after reheating if appropriate, for a second processing step. This is generally referred to as a two-step process. If the permeate stream requires further concentration (to recapture a valuable organic that would otherwise be lost, for example) it may be passed to a second bank of modules for a second-stage treatment. This is generally referred to as a two-stage process. Such multi-stage or multi-step processes, and variants thereof, are familiar to those of skill in the art, who will appreciate that the process may be configured in many possible ways, including single-stage, two-step, two-stage, or more complicated arrays of two or more units in series or cascade arrangements.

The dehydrated organic compound residue stream withdrawn from the membrane separation step is usually the primary product of the process and may pass to any destination. In most dehydration operations, it is preferred to configure the membrane separation steps to achieve a dehydrated product that contains less than 10 wt % water. Depending on the specific separation, much lower water concentrations in the product, such as less than 5 wt %, less than 1 wt %, or less than 0.5 wt % water may be required.

The water-rich permeate stream may be sent to any destination. Often, but not necessarily, this stream is simply a waste stream that is clean enough, as a result of the process of the invention, to discharge to the local sewer system. In other circumstances, it may be useful to recirculate this relatively clean water stream within the process, or to the plant, that produced the feed stream.

The processes of the invention may also include additional separation steps, carried out, for example, by adsorption, absorption, distillation, condensation or other types of membrane separation, either before or after the membrane separation process that has been described above.

Figure 4:
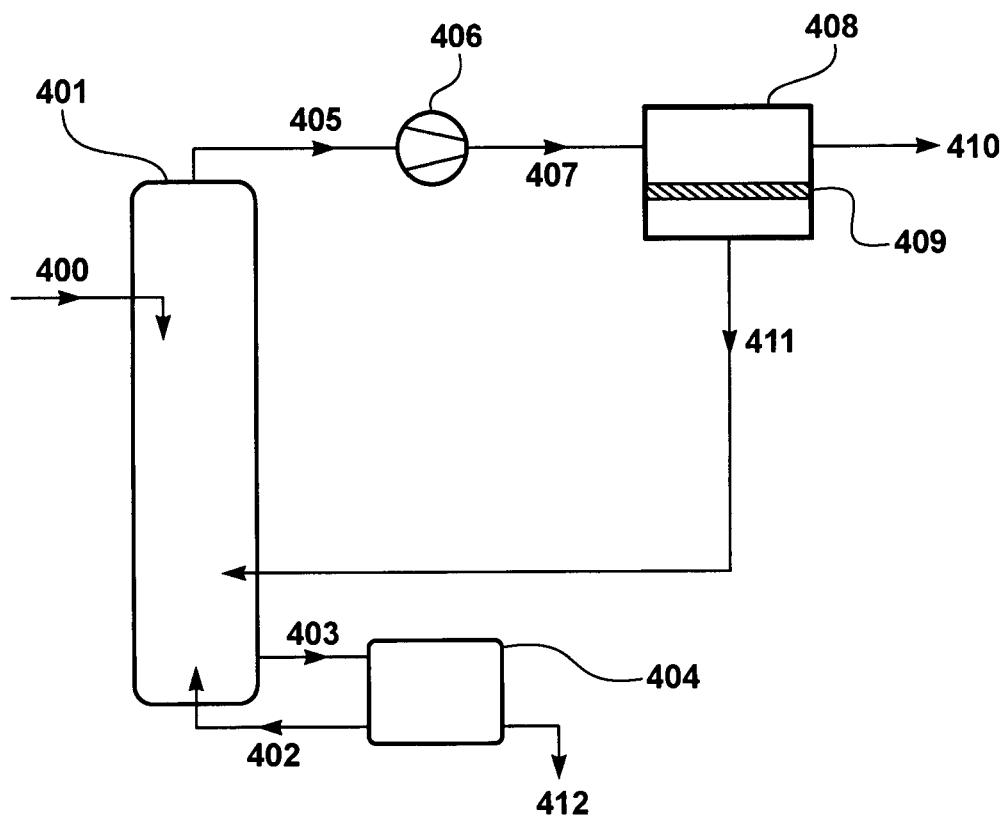
FIG. 4 is a schematic drawing of an embodiment of the invention in which the membrane separation is combined with separation by stripping or distillation.

One example of such a process is shown in FIG. 4, which is a schematic drawing of an embodiment of the invention in which membrane separation is combined with stripping or distillation. The figure is described below as it relates to the removal of water from a stream exiting a fermenter used to produce ethanol. This description is not intended to be limiting—it will be apparent to those of skill in the art that the same or a similar process could be applied to separate other organic compounds, of any type and from any source, that have suitable volatility to be steam stripped preferentially into the overhead vapor.

Referring to FIG. 4, feed stream 400 is a liquid stream from a fermentation process, containing ethanol and water, the ethanol being the minor component. For example, the ethanol content of the stream might be 3 wt %, 5 wt %, 10 wt % or 12 wt %. In the case that the feed derives directly from a fermenter, the stream may also contain other material that has been carried over from the fermentation step, including solid matter such as cell remnants and insoluble cellulosic matter, as well as sugars, proteins or the like.

The stream enters stripping column, 401. Such columns are well known and used in many industrial applications. The column may be of any design that allows contact between liquid and vapor phases in the column, and is preferably a packed or plate column. Pressure and temperature conditions within the column may be adjusted, as is known in the art, to suit the specific separation that is being carried out.

In the representative ethanol/water separation example of FIG. 4, the column is often referred to as the beer still. The beer still performs a stripping function, the stripping vapor being provided by a reboiler at the base of the column, but has no rectifier section. This column is typically, but not necessarily, operated under partial vacuum conditions, which can be set by the suction pressure of compressor, 406. If the feed stream is introduced to the column directly from the fermentation step, it will typically be at about 30-40° C.

As the feed liquid descends the column, it is contacted with a rising flow, 402, of stripping vapor generated by reboiler, 404, at the base of the column. Ethanol is transferred preferentially over water into the rising vapor phase, producing an ethanol-enriched vapor stream, 405, that is withdrawn from the top of the column. In the representative embodiment shown in FIG. 4, this vapor stream typically contains about 50 wt % each of water and ethanol.

Bottoms stream, 403, leaves the bottom of the stripper column, and will usually pass through the reboiler before being withdrawn as discharge stream, 412. This stream contains water and any solids that have been carried into the column with the feed stream, but typically contains less than 1 wt % ethanol, and preferably 0.1 wt % ethanol or less. This stream may be returned to the fermenter, discharged, concentrated to recover the contained solids, or otherwise disposed of as appropriate.

The overhead stream from the column passes through compressor 406, emerging as compressed vapor stream, 407, and enters the membrane separation unit, 408, which contains water-selective composite membranes, 409, of the composite type described above. As with FIGS. 1-3, the membrane separation unit contains one or multiple membrane modules, arranged in one or multiple steps or stages. For example, the configuration may involve two membrane sub-steps, with the residue stream from the first sub-step being passed as feed to the second sub-step.

Water preferentially permeates the membrane and emerges from the permeate side as permeate vapor stream, 411. This vapor may be returned to the column to augment the stripping vapor from the reboiler. The dehydrated residue vapor is withdrawn as residue stream, 410, from the feed side.

Figure 5:
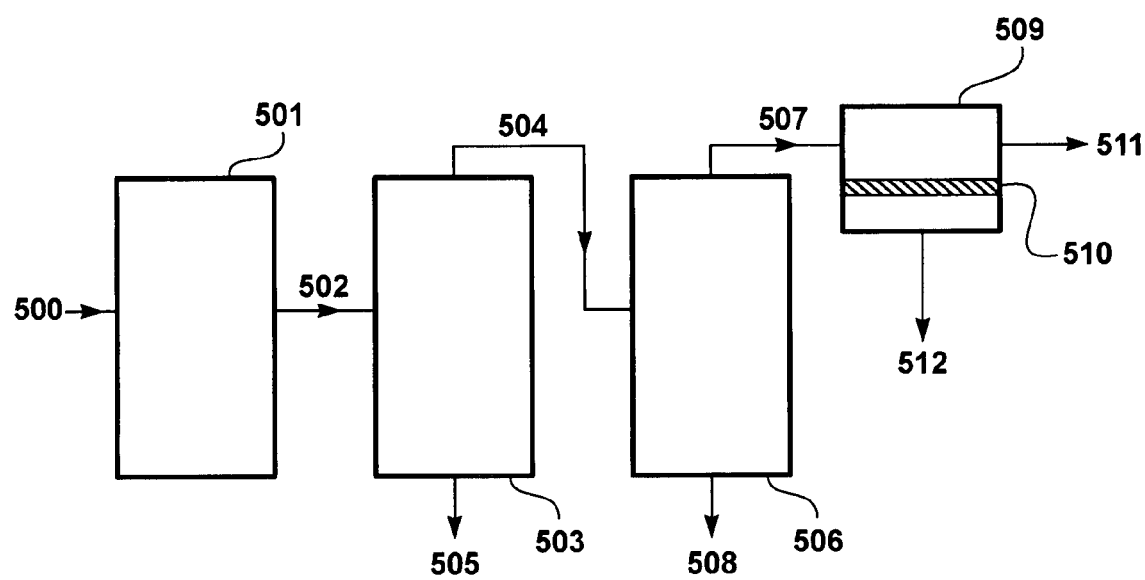
FIG. 5 is a schematic drawing of a process for producing alcohol from biomass.

The invention is expected to be particularly beneficial in the production of biofuels, that is fuels produced from biomass of some type. FIG. 5 illustrates this aspect of the invention, and like FIG. 4 is described as it relates to the production of ethanol, although it is not so limited, and could be used to produce other alcohols or alcohol mixtures, for example.

Referring to FIG. 5, feed biomass, 500, enters fermentation plant or step, 501. The biomass feedstock may be any biomass that contains a fermentable sugar, or that can be processed to produce a fermentable sugar. Examples of biomass that contains fermentable sugars include corn, sugar cane, beets, fruits and vegetables, wastes from processing fruits and vegetables, and cheese whey. Examples of wastes that can be processed to make fermentable sugars include cellulosic materials, such as grasses, grain stalks, hulls, and other agricultural wastes, and lignocellulosic materials, such as woody materials and wood wastes.

The fermentation itself uses any reaction that can convert a sugar to an alcohol and may be carried out in any convenient manner. Numerous fermentation techniques appropriate for use in alcohol production are well known in the art and described in the literature. The reactor may take the form of a single vessel, or may be staged, for example to provide different fermentation conditions in each stage. The reactor may be operated in any mode, such as batch, fed-batch, semi-continuous or continuous mode.

If the source material itself does not contain adequate quantities of sugar, but may be treated to form sugars, the fermentation step may include sub-steps that convert starch or cellulose to sugar, or that break down lignin and then convert exposed cellulose. These steps may be carried out as pretreatment before the material enters the fermentation vessel, or may be performed simultaneously with the fermentation.

The fermentation step may also include one or more filtration steps, to treat the fermentation broth to recover yeast cells or nutrients, or to remove suspended solids or dissolved salts, for example.

The product broth or solution from the fermentation step, 502, consists of water, ethanol as a minor component, and typically at least some other dissolved or suspended matter. The ethanol concentration in this stream is usually, but not necessarily, less than 15 wt % ethanol, such as 5 wt %, 10 wt % or 12 wt % ethanol. This stream passes to first separation step, 503. This step removes some of the water, and raises the ethanol concentration by at least about three-fold or five-fold, and preferably to at least about 50 wt %. The step may be carried out in a beer still, as described above with respect to FIG. 4, or by any other separation technique capable of raising the ethanol concentration sufficiently. In addition to the conventional beer still, another preferred option is to use membrane separation for this step. In this case the membranes to be used will preferably be selective in favor of ethanol over water, so as to create an ethanol-enriched permeate stream and a residue stream that is mostly water. The configuration and use of such membranes is taught in U.S. Pat. No. 6,755,975 and in U.S. Published Patent Application 2007/0031954.

This step produces an ethanol-enriched stream, 504, and an ethanol-depleted, water-rich stream, 505. Preferably this stream contains less than 1 wt % ethanol, as can be achieved with either a stripping column or a membrane separation unit.

The ethanol-rich stream, which may be in the vapor or liquid phase, passes to second separation step, 506. The goal of this step is to dehydrate the ethanol to produce a product that preferably contains at least 90 wt %, and more preferably higher, such as 95 wt % ethanol or above. The step may be carried out by any separation technique capable of raising the ethanol concentration to the desired level. In existing processes that do not incorporate a membrane separation step, this step is usually carried out by distillation. In this case, the maximum ethanol concentration of the ethanol-rich overhead stream will be the azeotropic concentration, that is, 96 wt % ethanol/4 wt % water. As another example, the step may be carried out by dephlegmation, as described in U.S. Pat. No. 6,755,975.

The second separation step produces ethanol-rich stream, 507, and ethanol-lean stream, 508. This water-enriched, ethanol-depleted stream may optionally be returned to the inlet of the first separation step.

Figure 7:
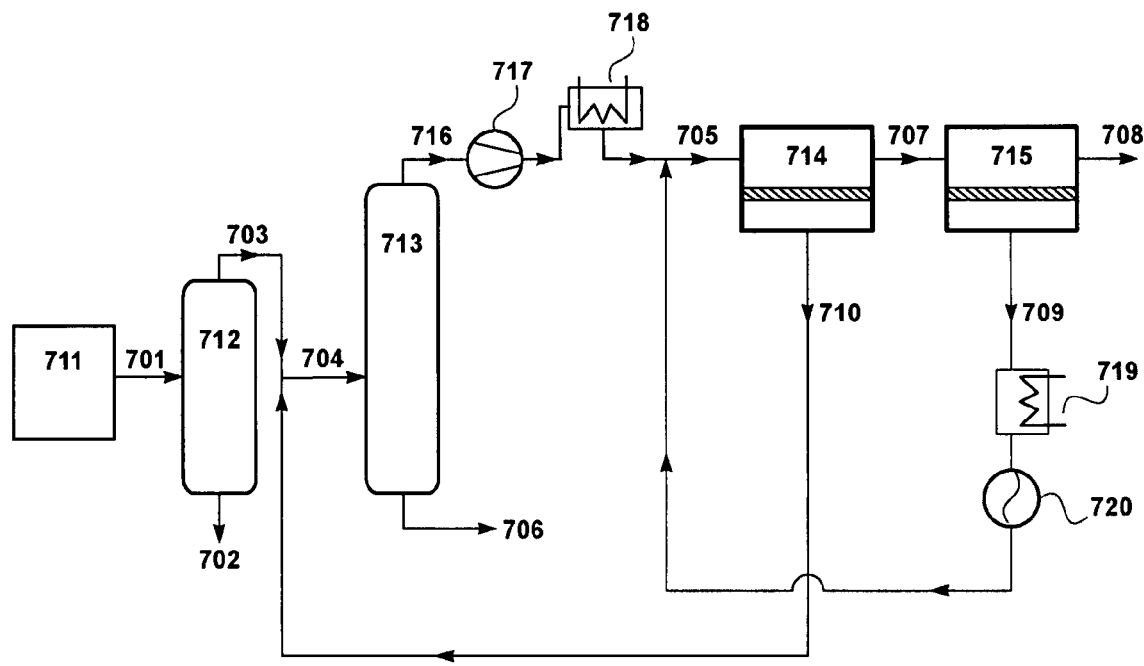
FIG. 7 is a schematic drawing of a process for producing alcohol from biomass, in which the membrane separation is performed as a two-step process.

The ethanol-rich stream, preferably containing at least 90 wt % ethanol, is passed as vapor or liquid to membrane dehydration unit or step, 509. This step uses one or multiple membrane modules, containing water-selective membranes, 510, of the composite type described above. The modules are arranged in one or multiple steps or stages. Performing this step as two sub-steps, as shown in FIG. 7, discussed in the Examples section, is often advantageous.

Water preferentially permeates the membranes, to produce a dehydrated ethanol product as the residue stream and a water-enriched permeate vapor stream, 512. The permeate vapor stream may optionally be recirculated within the process. The dehydrated ethanol product should preferably contain at least 99 wt % ethanol, and more preferably at least 99.5 wt % or 99.7 wt % ethanol.

As a less preferred alternative in any embodiment of the invention, a different type of polymer material may be used for the second selective layer. This material should be capable of deposition as a very thin, dense, non-porous layer onto the hydrophilic selective layer, should be insoluble in water, and of little or no swellability in water, so as to provide stable water permeation results at least comparable with those shown in FIGS. 8, 9 and 10, and discussed in the Examples section below. The material should also exhibit water/ethanol selectivity of at least about 30, and be of sufficiently high permeability that the finished membrane has a water permeance of at least about 500 gpu.

One example of such a less preferred material is a perfluorinated cyclic alkyl ether having the structure

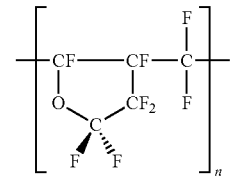

where n is a positive integer.

This material is available commercially from Asahi Glass Company, of Tokyo, Japan under the trade name Cytop®.

The invention is now further described by the following examples, which are intended to be illustrative of the invention, but are not intended to limit the scope or underlying principles in any way.

EXAMPLES

Example 1

Membranes

Composite membranes were made. All of them included microporous support layers made using standard casting procedures to apply polyvinylidene fluoride (PVDF) solution to polyphenyl sulfide (PPS) paper. One set of membranes had a Hyflon®AD60 selective layer applied from a 0.5 wt % solution; the other had a Teflon®AF1600 selective layer applied from a 1 wt % solution.

Celfa CMC VP-31 composite membrane was purchased from Folex-Celfa AG, Bahnhofstrasse 6423, Seewen, Switzerland. The membrane is a composite membrane suitable for pervaporation, with a hydrophilic selective layer of unknown composition.

The Celfa CMC VP-31 has only a hydrophilic selective layer; the membranes with the Hyflon®AD60 and Teflon®AF1600 layers have only a dioxole-based selective layer.

Example 2

Water Permeation with Hyflon®AD60 Selective Layer Only

Samples of the Hyflon®AD membranes of Example 1 were cut into stamps and tested in a permeation test-cell apparatus under pervaporation conditions with ethanol/water mixtures containing different amounts of water. The permeate pressure was maintained at 2.5 torr and the temperature of the feed solution was 75° C. The results are shown in Table 1.

TABLE 1

| Water Concentration in Feed (wt %) | Water Permeance (gpu) | Ethanol Permeance (gpu) | Water/Ethanol Selectivity |
|---|---|---|---|
| 4.7 | 960 | 15 | 64 |
| 17.8 | 1,090 | 17 | 64 |
| 21.2 | 1,060 | 17 | 63 |
| 67.0 | 1,160 | 19 | 61 |
| 86.5 | 1,090 | 16 | 68 |
| 95.7 | 1,370 | 18 | 76 |

As can be seen, the water and ethanol permeances were stable over the tested range, increasing only slightly with increasing water concentrations in the feed solution. The selectivity was also maintained over the range of feed water concentrations, but was only about 60 or 70.

Example 3

Water Permeation with Teflon®AF1600 Selective Layer Only

Samples of the Teflon®AF membranes of Example 1 were cut into stamps and tested in a permeation test-cell apparatus under pervaporation conditions with ethanol/water mixtures containing different amounts of water. The test conditions were the same as in Example 2. The results are shown in Table 2.

TABLE 2

| Water Concentration in Feed (wt %) | Water Permeance (gpu) | Ethanol Permeance (gpu) | Water/Ethanol Selectivity |
|---|---|---|---|
| 3.1 | 2,660 | 116 | 23 |
| 4.7 | 2,470 | 108 | 23 |
| 7.2 | 2,970 | 110 | 27 |
| 10.9 | 3,630 | 121 | 30 |
| 17.8 | 2,710 | 100 | 27 |
| 67.0 | 2,940 | 109 | 27 |

As can be seen, this membrane also exhibited good stability under exposure to high concentrations of hot water. The water/ethanol selectivity was considerably lower than for the Hyflon®AD membranes, however.

Example 4

Water Permeation with Celfa CMC VP-31 Membrane (Hydrophilic Selective Layer Only)

Samples of the purchased Celfa CMC VP-31 membranes from Example 1 were cut into stamps and tested in a permeation test-cell apparatus under pervaporation conditions with ethanol/water mixtures containing different amounts of water. The test conditions were the same as in Example 2. The results are shown in Table 3.

TABLE 3

| Water Concentration in Feed (wt %) | Water Permeance (gpu) | Ethanol Permeance (gpu) | Water/Ethanol Selectivity |
|---|---|---|---|
| 3.2 | 3,740 | 8 | 470 |
| 7.4 | 4,310 | 12 | 360 |
| 10.1 | 5,870 | 20 | 290 |
| 15.3 | 7,370 | 29 | 250 |
| 22.5 | 8,650 | 57 | 150 |
| 30.7 | 10,700 | 147 | 73 |

As can be seen, the Celfa membranes exhibited a combination of much higher water permeance and much higher water/ethanol selectivity than the dioxole-based membranes at low water concentrations. The permeances to both water and ethanol increased very substantially as the water concentration in the feed solution increased, indicating swelling of the hydrophilic membrane in the presence of water. The result was a sharp decline in membrane selectivity, from over 300 when the water concentration was below 10 wt % to below 200 when the water concentration was about 20 wt % and below 100 when the water concentration was about 30 wt %.

Example 5

Comparison of Hyflon®AD, Teflon®AF and Celfa CMC VP-31 Membranes

Figure 8:
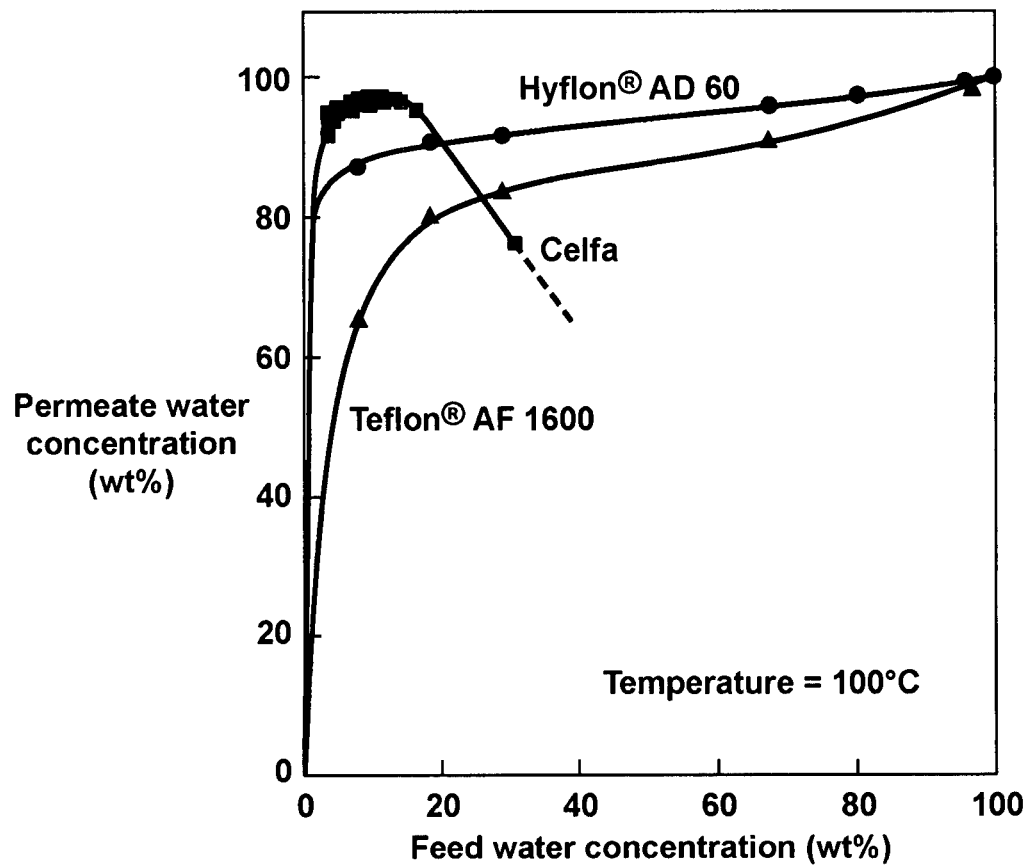
FIG. 8 is a graph comparing the performance of Hyflon®AD, Teflon®AF and Celfa CMC VP-31 membranes in the form of a plot of permeate water concentration against feed water concentration at different feed water concentrations.

Results from test-cell experiments of the type reported in Examples 2, 3, and 4 were plotted to compare the pervaporation performance of the different membranes. The results are shown in FIG. 8 in the form of a plot of permeate water concentration against feed water concentration. As can be seen, even though this was a simple one-stage experiment, at low feed water concentrations, the Celfa membranes were able to produce a permeate that was mostly water, with only a couple of percent ethanol, an indication of the very high selectivity of the membranes under these conditions. Under the same conditions, both membranes having only dioxole-based selective layers performed well, but could not produce a permeate with a water concentration comparable to the Celfa membranes.

At above about 10 wt % water in the feed, the performance of the Celfa membranes began to drop off sharply, and the Celfa membranes performed less well than the Hyflon®AD membranes after the water concentration in the feed reached about 20 wt % and less well than the Teflon®AF membranes after the water concentration in the feed reached about 25 wt %.

The Hyflon®AD membranes could produce a permeate containing less than 18 wt % ethanol across the entire range of water concentrations.

The experiments were repeated with butanol/water mixtures and similar results were obtained.

Example 6

Celfa CMC VP 31/Hyflon®AD Membranes in Accordance with the Invention

Celfa CMC VP 31 membranes as purchased were dip-coated in Hyflon®AD60 solutions of different polymer concentrations and dried in an oven at 60° C. for 10 minutes, to yield membranes of the type shown in FIG. 1, having both a hydrophilic selective layer and a dioxole-based selective layer.

The coating solution concentration was varied from 0.25 wt % to 1 wt %. The membranes had dioxole-based selective layers of different thicknesses, depending on the concentration of Hyflon®AD in the coating solution.

Samples of the membranes were cut into stamps and tested in a permeation test cell apparatus, following the procedure described above for Example 2. The results are shown in Tables 4, 5 and 6.

TABLE 4

Membrane made with coating solution concentration of 0.25 wt % Hyflon ® AD60

| Water Concentration in Feed (wt %) | Water Permeance (gpu) | Ethanol Permeance (gpu) | Water/Ethanol Selectivity |
|---|---|---|---|
| 9.78 | 6,420 | 14 | 450 |
| 21.9 | 9,910 | 44 | 220 |
| 50.0 | 21,140 | 1,270 | 17 |
| 86.0 | 27,000 | 5,460 | 5 |

TABLE 5

Membrane made with coating solution concentration of 0.5 wt % Hyflon ® AD60

| Water Concentration in Feed (wt %) | Water Permeance (gpu) | Ethanol Permeance (gpu) | Water/Ethanol Selectivity |
|---|---|---|---|
| 9.78 | 3,720 | 8 | 490 |
| 21.9 | 5,330 | 13 | 407 |
| 50.0 | 7,110 | 65 | 110 |
| 86.0 | 8,640 | 400 | 22 |

TABLE 6

Membrane made with coating solution concentration of 1.0 wt % Hyflon ® AD60

| Water Concentration in Feed (wt %) | Water Permeance (gpu) | Ethanol Permeance (gpu) | Water/Ethanol Selectivity |
|---|---|---|---|
| 9.78 | 2,890 | 6 | 490 |
| 21.9 | 2,430 | 6 | 380 |
| 50.0 | 3,700 | 23 | 160 |
| 86.0 | 3,720 | 91 | 4 |

Figure 9:
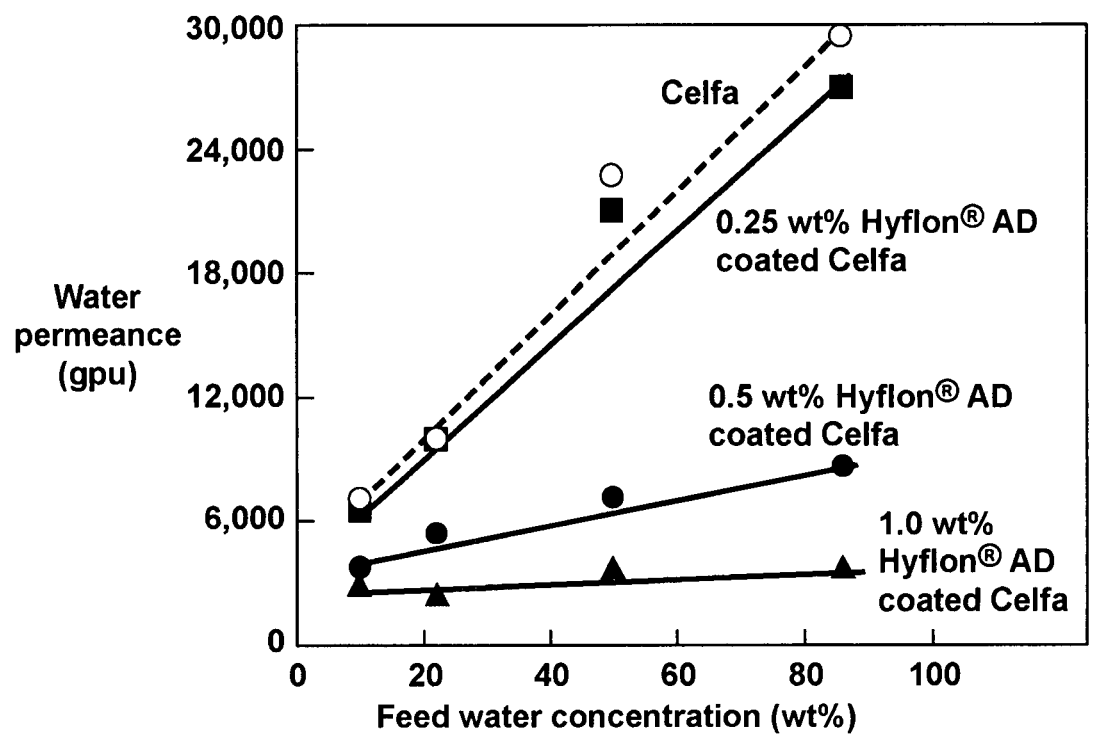
FIG. 9 is a plot comparing the water permeances of Celfa CMC VP-31 membranes having Hyflon®AD layers of different thicknesses.
Figure 10:
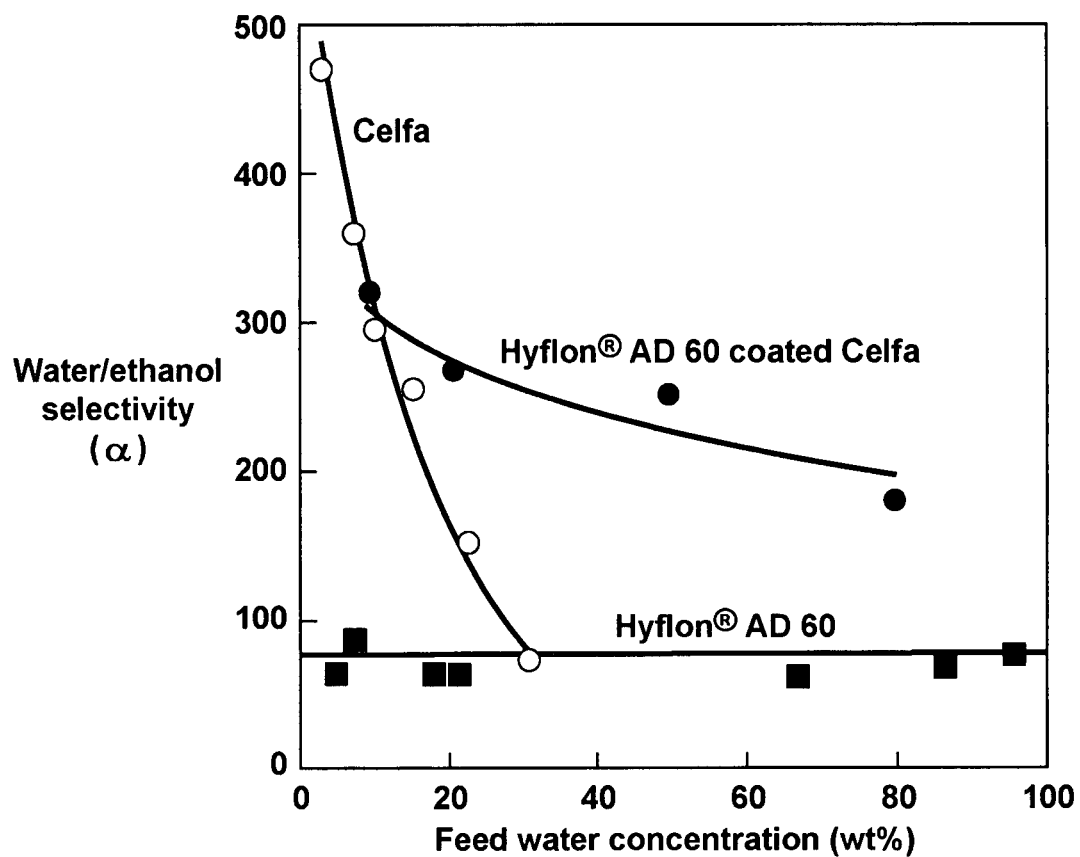
FIG. 10 is a graph comparing the water/ethanol selectivity of Celfa CMC VP-31 membranes, Hyflon®AD membranes and Celfa CMC VP-31/Hyflon®AD membranes at different feed water concentrations.

FIG. 9 is a plot comparing the data from Tables 4, 5 and 6 with results obtained from Celfa membranes without a Hyflon®AD layer. As can be seen, the membranes with the thinnest Hyflon®AD layer showed essentially the same water permeance as the uncoated Celfa membranes, indicating that the layer was too thin to influence the water permeation properties. The membrane with the thickest dioxole-based selective layer exhibited the most stable performance over the range of water concentrations in terms of water permeance. In other words, the thickest layer best protected the Celfa membrane from swelling, while still providing high permeability to water.

Example 7

Membrane Selectivity Performance Comparison

Samples of three membranes types were prepared:
(i) Celfa CMC VP 31 as purchased;
(ii) 0.5 wt % Hyflon®AD60 selective layer, prepared as in Example 1;
(iii) 0.5 wt % Hyflon®AD60 on purchased Celfa CMC VP 31, prepared as in Example 6.

Only membrane type (iii) was in accordance with the invention.

Samples of the membranes were cut into stamps and tested in a permeation test cell apparatus, following the procedure described above for Example 2. The results are shown in Table 7 and FIG. 10.

TABLE 7

| Membrane Type | Water Concentration in Feed (wt %) | Water Permeance (gpu) | Ethanol Permeance (gpu) | Water/Ethanol Selectivity |
|---|---|---|---|---|
| (i) Hydrophilic selective layer only | 7 | 4310 | 12 | 370 |
| | 22 | 8,640 | 57 | 150 |
| | 31 | 10,670 | 147 | 70 |
| (ii) Dioxole-based selective layer only | 7 | 770 | 9 | 90 |
| | 28 | 1,110 | 18 | 60 |
| | 67 | 1,160 | 19 | 60 |
| (iii) Hydrophilic and dioxole-based selective layers | 10 | 3,600 | 11 | 320 |
| | 21 | 5,650 | 21 | 270 |
| | 50 | 5,890 | 22 | 260 |

As can be seen, the membranes having only a hydrophilic selective layer outperform the other membranes with respect to water/ethanol selectivity at low water concentrations. The membranes having only a dioxole-based selective layer exhibit much more stable water/ethanol selectivity, and match the selectivity of the hydrophilic membranes when the water content of the feed reaches about 30 wt %.

At all water concentrations above about 10 wt %, the membranes having both a hydrophilic selective layer and a dioxole-based selective layer exhibit higher selectivity than either the hydrophilic Celfa membrane or the dioxole-based Hyflon®AD membrane. Furthermore, this selectivity remains reasonably stable and high, at 200 or above, even when the feed solution contains 80 wt % water. Neither of the other membranes come close to this performance, as both have a selectivity less than 100 at high water concentrations.

Example 8

Comparison of Membranes using Hyflon®AD and Teflon®AF as Dioxole-Based Selective Layer Two sets of membranes with a hydrophilic selective layer and a dioxole-based selective layer were made by coating purchased Celfa CMC VP 31 membranes using either a single coating of a solution containing 0.5 wt % Teflon®AF or 0.5 wt % Hyflon®AD60.

Figure 11:
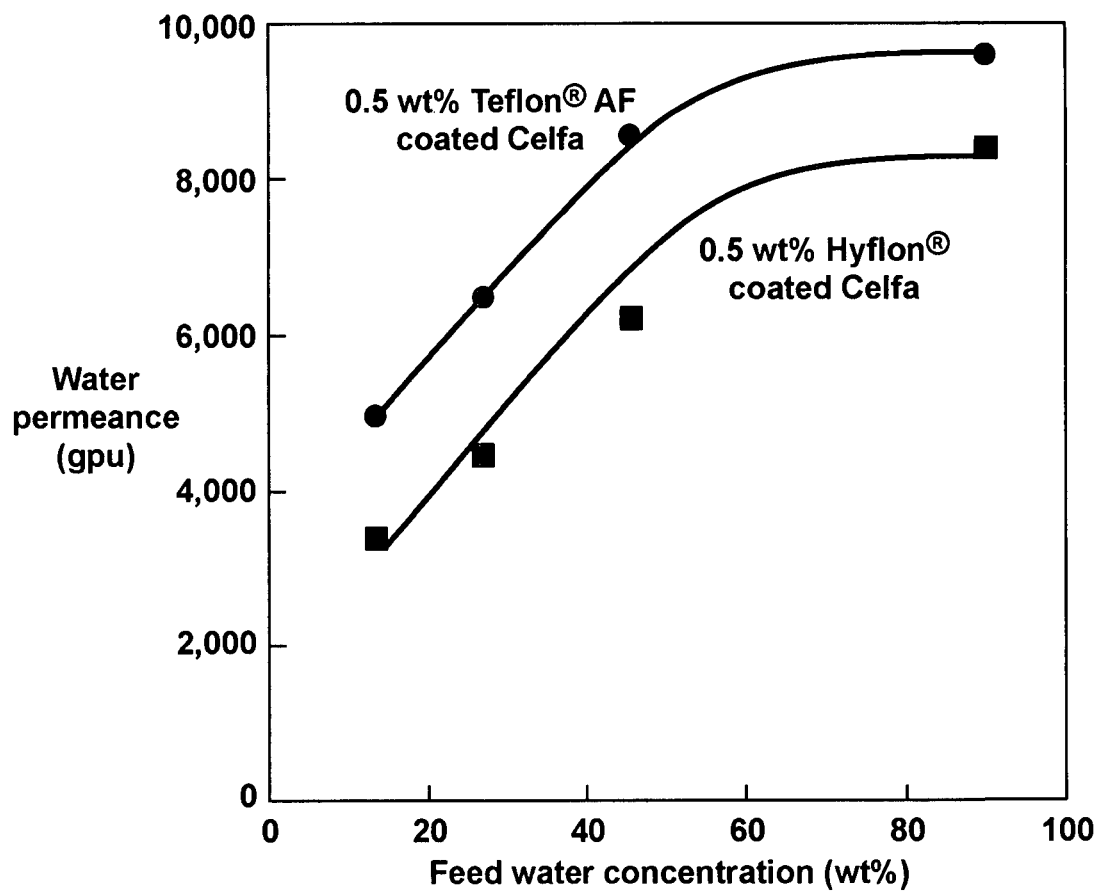
FIG. 11 is a graph comparing water permeance of otherwise similar membranes having Hyflon®AD and Teflon®AF layers.

Samples of the membranes were cut into stamps and tested in a permeation test cell apparatus, following the procedure described above for Example 2. The results are shown as a plot of water permeance of the membranes against feed water concentration in FIG. 11. As can be seen, the membranes with the Teflon®AF coating show higher water permeance than those with the Hyflon®AD coating over the range of water concentrations in the feed. For each membrane, the water permeance roughly doubles from 10 wt % to 90 wt % feed water concentration.

Example 9

Process Calculations for Stripping/Membrane Hybrid Process

A computer calculation was performed to simulate the performance of a process of the type shown in FIG. 4 in separating water from ethanol. The calculation was carried out a modeling program, ChemCad V (ChemStations, Inc., Houston, Tex.), modified with MTR proprietary code. The feed stream to the process was assumed to be a solution of 11.5 wt % ethanol in water; the goal was to produce a dehydrated ethanol stream with an ethanol concentration of 99.7 wt % ethanol, such as would be suitable as fuel-grade ethanol.

The process uses a stripping step followed by a membrane separation step, as in FIG. 4. The stripping step was assumed to be performed as in a beer still, with no condensation/rectification for the overhead vapor from the column. In this case, the membrane separation step was assumed to be performed in two sub-steps. Each sub-step was assumed to use Celfa CMC VP 31 membranes with an additional selective layer of Hyflon®AD60, prepared as in Example 7. In the alternative, if the feed to the second sub-step contains a relatively low concentration of water, it is possible to use a membrane with only the hydrophilic selective layer for the second sub-step.

Figure 6:
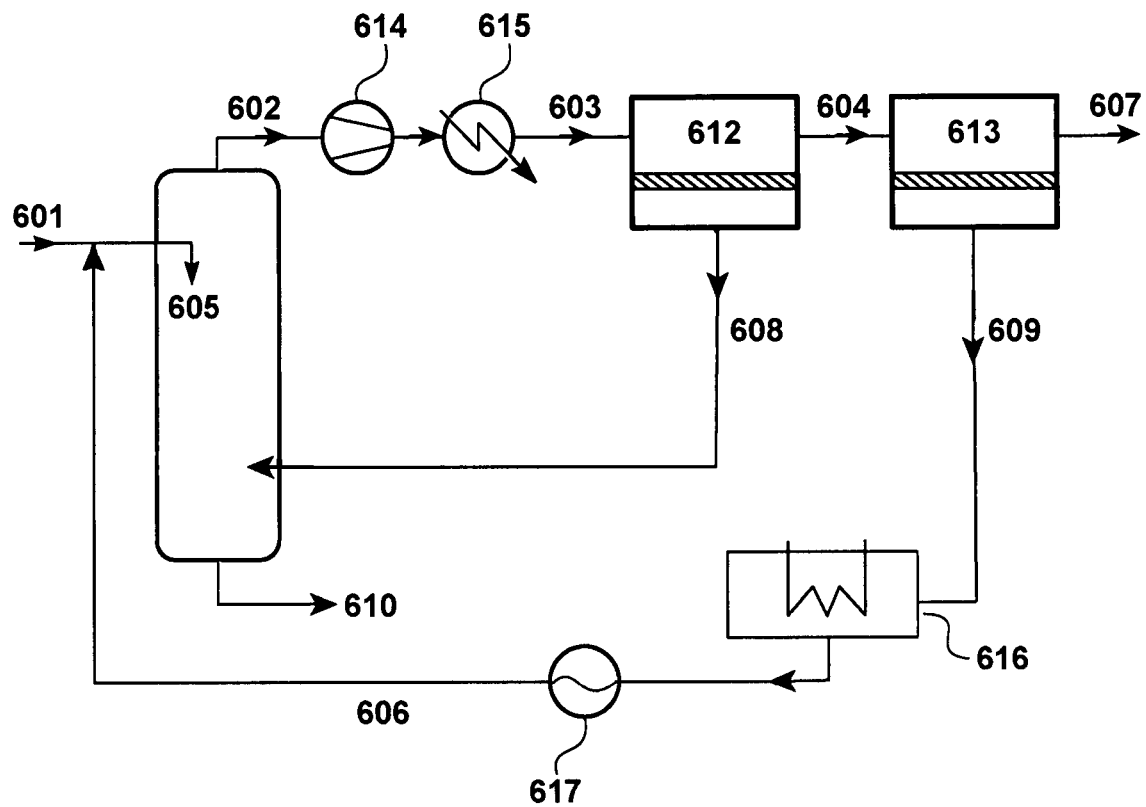
FIG. 6 is a schematic drawing of an embodiment of the invention in which the membrane separation is combined with stripping, and in which the membrane separation is performed as a two-step process.

The process flow diagram is shown in FIG. 6. Referring to this figure, liquid feed stream, 601, enters stripping column or beer still, 605, which operates at the suction pressure of compressor, 614, that is, half an atmosphere pressure.

Ethanol-enriched vapor stream, 602, is withdrawn from the top of the column, and water stream, 610, is withdrawn from the bottom, after passing through the reboiler (not shown).

The overhead stream from the column passes through compressor, 614, and is cooled, 615, before entering the first membrane separation step, 612, as membrane feed stream, 603. This step uses about 1,600 m² of membrane area to reduce the water content of the process stream to about 10 wt %. Water preferentially permeates the membranes and emerges from the permeate side as first permeate vapor stream, 608. This stream is returned to the stripping column. The first dehydrated residue vapor is withdrawn as residue stream, 604, and passes as feed to the second membrane separation step, 613, which uses about 5,000 m² of membrane area.

The residue stream, 607, from this step is the dehydrated ethanol product of the process, containing 99.7 wt % ethanol. The second permeate stream, 609, is condensed, 616, and pumped by liquid pump, 617, to return to the beer still as stream, 606.

The results of the calculation are shown in Table 8. As can be seen, the process produces a high-quality ethanol product and a water stream with very little ethanol.

Example 10

Process Calculations for Bioethanol Production Process

A computer calculation was performed to simulate the performance of a process of the type shown in FIG. 5 to produce ethanol from biomass. The calculation was again carried out using ChemCad V. The fermentation step was not modeled, but was assumed to produce a solution containing 111.5 wt % ethanol in water, as might be produced from conventional fermentation of corn, for example.

The membrane separation step was assumed to be performed in two sub-steps. Each sub-step was assumed to use Celfa CMC VP 31 membranes with an additional selective layer of Hyflon®AD60, prepared as in Example 7. In the alternative, the second sub-step, which is exposed to only a low water concentration in its feed stream, could be carried out using a membrane having only a hydrophilic selective layer.

The process flow diagram is shown in FIG. 7. Referring to this figure, fermentation step, 711, yields stream, 701, containing 11.5 wt % ethanol. This stream enters beer still, 712, and is separated into water stream, 702, and overhead vapor stream, 703. The overhead stream from the stripper is mixed with return stream, 710, and enters distillation or rectification column, 713, as stream, 704. Both the stripper and the rectification column operate at half an atmosphere pressure, created by the suction of compressor, 717.

The distillation step produces an overhead stream, 716, containing about 93 wt % ethanol. Because the membrane separation steps are relied on for the final purification of the ethanol product, the distillation column overhead need not be driven all the way to the azeotrope. The bottoms stream, 706, from this column, like the bottoms stream from the stripper, contains very little ethanol.

The overhead from the distillation column is compressed, 717, condensed, 718, and mixed with return stream, 709, to be sent as a feed stream, 705, after heating to provide transmembrane driving force (not shown), to the first membrane separation step, 714. This step uses about 1,200 m² of membrane area.

Water preferentially permeates the membranes and emerges from the permeate side as first permeate vapor stream, 710. This stream is recirculated to be mixed with stream 703 as feed to the rectification column. The first dehydrated residue vapor is withdrawn as residue stream, 707, and passes as feed to the second membrane separation step, 715, which uses about 4,400 m² of membrane area.

The residue stream, 708, from this step is the dehydrated ethanol product, containing 99.7 wt % ethanol. The permeate stream, 709, is condensed, 719, and pumped by liquid pump, 720, to return to the front of the membrane separation unit.

The results of the calculation are shown in Table 9. Once again, the process produces a high-quality ethanol product and a water stream with very little ethanol.

TABLE 8

| Stream | Process feed 601 | 602 | 603 | Water stream 610 | 604 | 608 | Ethanol product 607 | 609 | 606 |
|---|---|---|---|---|---|---|---|---|---|
| Flux (kg/h) | 165,000 | 32,650 | 32,650 | 146,111 | 22,207 | 11,443 | 18,888 | 3,318 | 3,318 |
| Temp. (° C.) | 37 | 70 | 120 | 81 | 116 | 118 | 114 | 30 | 32 |
| Pressure (bar) | 1.0 | 0.5 | 3.0 | 0.5 | 3.0 | 0.5 | 3.0 | 0.1 | 1.0 |
| Water (wt %) | 88.5 | 36.3 | 36.3 | 99.9 | 9.9 | 92.5 | 0.3 | 64.7 | 64.7 |
| Ethanol (wt %) | 11.5 | 63.7 | 63.7 | 0.1 | 90.1 | 7.5 | 99.7 | 35.3 | 35.3 |

TABLE 9

| Stream | Process feed 701 | 703 | Water stream 702 | 716 | 705 | Water stream 706 | 707 | Ethanol product 708 | 709 | 710 |
|---|---|---|---|---|---|---|---|---|---|---|
| Flux (kg/h) | 165,000 | 35,273 | 129,726 | 20,750 | 22,412 | 16,387 | 20,548 | 18,885 | 1,663 | 1,864 |
| Temp (° C.) | 37 | 73 | 81 | 61 | 115 | 81 | 115 | 42 | 110 | 110 |
| Pressure (bar) | 1.0 | 0.5 | 0.5 | 0.5 | 4.0 | 0.5 | 4.0 | 4.0 | 0.1 | 0.2 |
| Water (wt %) | 88.5 | 46.6 | 99.9 | 7.0 | 9.0 | 99.9 | 3.0 | 0.3 | 33.7 | 74.9 |
| Ethanol (wt %) | 11.5 | 53.4 | 0.1 | 93.0 | 91.0 | 0.1 | 97.0 | 99.7 | 66.3 | 25.1 |

We claim:

1. A process for separating water from organic compounds comprising:
   (a) providing a composite membrane having a feed side and a permeate side, the composite membrane comprising:
      (i) a microporous support layer;
      (ii) a first dense selective layer of a hydrophilic polymer; and
      (iii) a second dense selective layer of a dioxole-based polymer having the structure

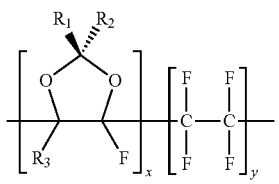

wherein $R_1$ and $R_2$ are fluorine or $CF_3$ $R_3$ is fluorine or $-O-CF_3$, and x and y represent the relative proportions of the dioxole and the tetrafluoroethylene blocks, such that $x+y=1$;
   the first dense selective layer being positioned between the microporous support layer and the second dense selective layer;
   (b) passing a feed solution comprising at least 10 wt % water and an organic compound across the feed side;
   (c) withdrawing from the feed side a dehydrated solution having a lower water content than that of the feed solution;
   (d) withdrawing from the permeate side a permeate vapor having a higher water content than that of the feed solution, wherein the composite membrane provides a water permeance of at least about 500 gpu when in operation in the process.

2. The process of claim 1, wherein the hydrophilic polymer is polyvinyl alcohol.

3. The process of claim 1. wherein the hydrophilic polymer is a cellulose derivative.

4. The process of claim 1, wherein the dioxole-based polymer has the structure

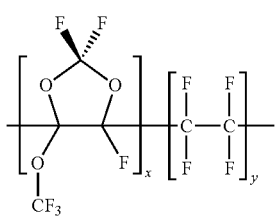

where x and y represent the relative proportions of the dioxole and the tetrafluoroethylene blocks, such that $x+y=1$.

5. The process of claim 1, wherein the dioxole-based polymer has the structure

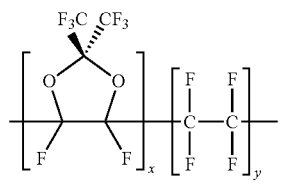

where x and y represent the relative proportions of the dioxole and the tetrafluoroethylene blocks, such that $x+y=1$.

6. The process of claim 1, wherein the feed solution has a water content of at least 50 wt %.

7. The process of claim 1, wherein the feed solution is at a temperature of at least about 60° C.

8. The process of claim 1, wherein the organic compound is chosen from the group consisting of methanol, ethanol, isopropanol, butanol, acetone, acetic acid and formaldehyde.

9. The process of claim 1, wherein the organic compound is ethanol.

10. The process of claim 1, in which the composite membrane exhibits a higher water/organic compound selectivity than is exhibited by either (a) a first membrane having only a hydrophilic polymer selective layer of the same hydrophilic polymer as the first dense selective layer, or (b) a second membrane having only a dioxole-based polymer selective layer of the same dioxole-based polymer as the second dense selective layer.

11. The process of claim 1, further comprising passing the dehydrated solution across a second composite membrane to create a dehydrated product solution that has a lower water content than that of the dehydrated solution.

12. A process for separating water from organic compounds in which water has a solubility of at least about 5 wt % comprising:
   (a) providing a composite membrane having a feed side and a permeate side, the membrane comprising:
      (i) a microporous support layer;
      (ii) a first dense selective layer of a hydrophilic polymer; and
      (iii) a second dense selective layer of a dioxole-based polymer having the structure

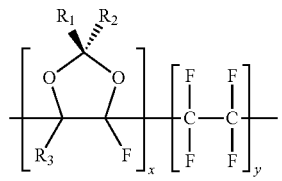

wherein $R_1$ and $R_2$ are fluorine or $CF_3$, $R_3$ is fluorine or —O—$CF_3$, and x and y represent the relative proportions of the dioxole and the tetrafluoroethylene blocks, such that x+y=1;

the first dense selective layer being positioned between the microporous support layer and the second dense selective layer;

(b) passing a feed vapor comprising at least 10 wt % water and an organic compound across the feed side;

(c) withdrawing from the feed side a dehydrated vapor having a water content lower than that of the feed vapor;

(d) withdrawing from the permeate side a permeate vapor having a higher water content than the feed vapor, wherein the composite membrane provides a water pemeance of at least about 500 gpu when in operation in the process.

13. The process of claim 12, wherein the hydrophilic polymer is polyvinyl alcohol.

14. The process of claim 12, wherein the hydrophilic polymer is a cellulose derivative.

15. The process of claim 12, wherein the dioxole-based polymer has the structure

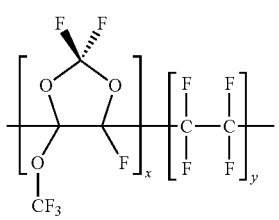

where x and y represent the relative proportions of the dioxole and the tetrafluoroethylene blocks, such that x+y=1.

16. The process of claim 12, wherein the dioxoie-based polymer has the structure

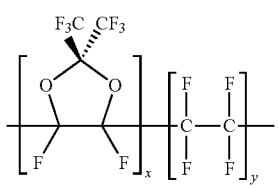

where x and y represent the relative proportions of the dioxole and the tetrafluoroethylene blocks, such that x+y=1.

17. The process of claim 12, wherein the feed vapor has a water content of at least 50 wt %.

18. The process of claim 12, wherein the organic compound is ethanol.

19. The process of claim 12, in which the composite membrane exhibits a higher water/organic compound selectivity than is exhibited by either (a) a first membrane having only a hydrophilic polymer selective layer of the same hydrophilic polymer as the first dense selective layer, or (b) a second membrane having only a dioxole-based polymer selective layer of the same dioxole-based polymer as the second dense selective layer.

20. The process of claim 12, further comprising passing the dehydrated vapor across a second composite membrane to create a dehydrated product vapor that has a lower water content than that of the dehydrated vapor, 21. The process of claim 12, wherein the feed vapor is obtained by stripping a feed solution containing water and an organic compound.

22. A stripping/membrane separation process for separating water from organic compounds in which water has a solubility of at least about 5 wt % comprising:

(a) subjecting a feed solution comprising at least 10 wt % water and an organic compound to a stripping step, thereby producing an organic-compound-enriched overhead vapor stream and an organic-compound-depleted bottoms stream;

(b) subjecting the overhead vapor stream to a membrane separation step comprising:

(I) providing a composite membrane having a feed side and a permeate side, the membrane comprising:

(i) a microporous support layer;

(ii) a first dense selective layer of a hydrophilic polymer; and (iii) a second dense selective layer of a dioxole-based polymer having the structure

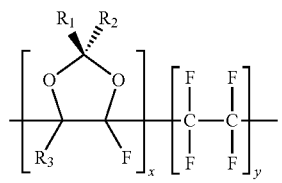

wherein $R_1$ and $R_2$ are fluorine or $CF_3$, $R_3$ is fluorine or —O—$CF_3$, and x and y represent the relative proportions of the dioxole and the tetrafluoroethylene blocks, such that x+y=1;

the first dense selective layer being positioned between the microporous support layer and the second dense selective layer;

(II) passing the overhead feed vapor across the feed side;

(III) withdrawing from the feed side a dehydrated vapor having a water content lower than that of the overhead feed vapor;

(IV) withdrawing from the permeate side a permeate vapor having a higher water content than that of the overhead feed vapor, wherein the composite membrane provides a water permeance of at least about 500 gpu when in operation in the process.

23. The stripping/membrane separation process of claim 22, wherein the organic compound comprises ethanol.

24. The stripping/membrane separation process of claim 22, wherein the dioxole-based polymer has the structure

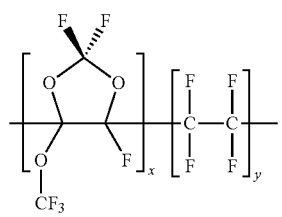

where x and y represent the relative proportions of the dioxole and the tetrafluoroethylene blocks, such that x+y=1.

25. The stripping/membrane separation process of claim 22, wherein the dioxole-based polymer has the structure

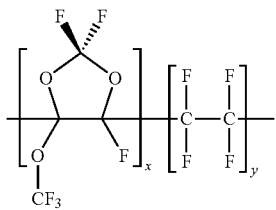

where x and y represent the relative proportions of the dioxole and the tetrafluoroethylene blocks, such that x+y=1.

26. The stripping/membrane separation process of claim 22, further comprising passing the dehydrated vapor across a second composite membrane to create a dehydrated product vapor that has a lower water content than that of the dehydrated vapor.

27. An ethanol production process, comprising the following steps:
  (a) fermenting a biomass to produce ethanol;
  (b) subjecting an ethanol-containing stream from step (a) to a first separation step to increase the ethanol concentration by at least three-fold to produce an ethanol-enriched stream;
  (c) subjecting the ethanol-enriched stream to a second separation step to further enrich the ethanol concentration to produce an ethanol-rich stream and an ethanol-lean stream;
  (d) subjecting the comprising at least 10 wt % water to a dehydration step using a composite membrane having a feed side and a permeate side, the membrane comprising:
    (i) a microporous support layer;
    (ii) a first dense selective layer of a hydrophilic polymer; and
    (iii) a second dense selective layer of a dioxole-based polymer having the structure

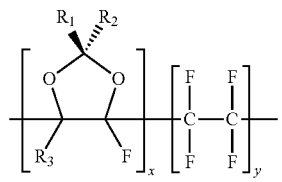

wherein $R_1$ and $R_2$ are fluorine or $CF_3$, $R_3$ is fluorine or $-O-CF_3$, and x and y represent the relative proportions of the dioxole and the tetrafluoroethylene blocks, such that x+y=1;
the first dense selective layer being positioned between the microporous support layer and the second dense selective layer, thereby producing a dehydrated ethanol product.

28. The ethanol production process of claim 27, wherein the ethanol-rich stream is sent to the dehydration step as a vapor.

29. The ethanol production process of claim 27, wherein the ethanol-containing stream has an ethanol concentration less than 15 wt %, the ethanol-enriched stream has an ethanol concentration of at least 50 wt % and the dehydrated ethanol product has an ethanol concentration of at least 99 wt %.

30. The ethanol production process of claim 27, wherein the dehydration step is performed in two sub-steps, 31. The ethanol production process of claim 27, wherein the first separation step comprises a steam-stripping step.

32. The ethanol production process of claim 27, wherein the second separation step comprises a distillation step.

* * * * *